(12) United States Patent
Sun et al.

(10) Patent No.: US 8,986,425 B2
(45) Date of Patent: Mar. 24, 2015

(54) METHOD FOR RECOVERING RARE EARTH COMPOUNDS, VANADIUM AND NICKEL

(75) Inventors: Yu-Lung Sun, Kaohsiung (TW);
Ming-Zhe Tsai, Yunlin (TW);
Yung-Hao Liu, Kaohsiung (TW)

(73) Assignee: Hong Jing Environment Company, Kaohsiung (TW)

( * ) Notice: Subject to any disclaimer, the term of this patent is extended or adjusted under 35 U.S.C. 154(b) by 546 days.

(21) Appl. No.: 13/305,085

(22) Filed: Nov. 28, 2011

(65) Prior Publication Data
US 2013/0091989 A1 Apr. 18, 2013

(30) Foreign Application Priority Data

Oct. 13, 2011 (TW) ............................... 100137188 A

(51) Int. Cl.
*C22B 59/00* (2006.01)
*C22B 34/22* (2006.01)
*C22B 23/00* (2006.01)
*C22B 7/00* (2006.01)

(52) U.S. Cl.
CPC ............... *C22B 7/007* (2013.01); *C22B 34/225* (2013.01); *C22B 59/00* (2013.01)
USPC ................. 75/739; 75/743; 423/21.1; 423/63; 423/68; 423/139; 423/150.1; 423/150.2

(58) Field of Classification Search
CPC ............. C01G 200/706; C22B 23/043; C22B 23/0407; C22B 23/0453; C22B 7/007; C22B 34/225; B09B 3/0016; B01D 2255/206; B01D 2255/20723; B01D 2255/20753
USPC ................. 423/21.1, 21.5, 63, 68, 139, 150.2, 423/150.1; 75/743, 711; 210/660–694
See application file for complete search history.

(56) References Cited

U.S. PATENT DOCUMENTS

| 4,670,228 A | 6/1987 | Braaten |
| 4,721,606 A * | 1/1988 | Tilley ............................... 423/54 |
| 5,639,433 A | 6/1997 | Yuan et al. |
| 2012/0156116 A1* | 6/2012 | Gao et al. ..................... 423/21.1 |

FOREIGN PATENT DOCUMENTS

CN 101705380 A * 5/2010 .............. C22B 59/00

OTHER PUBLICATIONS

Machine translation of CN 101705380.*

* cited by examiner

*Primary Examiner* — George Wyszomierski
*Assistant Examiner* — Tima M McGuthry Banks
(74) *Attorney, Agent, or Firm* — Muncy, Geissler, Olds & Lowe, P.C.

(57) ABSTRACT

A method for recovering rare earth compounds, vanadium and nickel from waste vanadium-nickel catalysts, comprising steps of: acid leaching, by soaking waste vanadium-nickel catalysts into a sulfuric acid solution and obtaining a mixture containing alumina silica slag; sedimentation, by filtering out the alumina silica slag from the mixture to obtain a filtrate, and then adding a salt into the filtrate to precipitate rare earth double salts followed by isolating a sediment of rare earth double salts and a liquid solution via filtration; and extraction, by providing and adding an alkali into the sediment of rare earth double salts followed by further soaking the rare earth double salts in an acid solution to precipitate rare earth oxalate or rare earth carbonate, and adding an oxidizer into the liquid solution to adjust the pH value thereof and then extracting vanadium and nickel from the liquid solution via an ion-exchange resin.

10 Claims, 2 Drawing Sheets

METHOD FOR RECOVERING RARE EARTH COMPOUNDS, VANADIUM AND NICKEL

BACKGROUND OF THE INVENTION

1. Field of the Invention

The present invention relates to a method for recovering metals from waste catalysts, particularly to a method for recovering rare earth compounds, vanadium and nickel from waste vanadium-nickel catalysts.

2. Description of the Related Art

In the oil-refining industry, catalysts have been widely used in oil-cracking processes, for example fluidized catalytic cracking (FCC), or residue oil cracking (ROC).

During the cracking processes, the FCC and ROC tend to be ineffective due to the contamination and absorption of heavy metals from feedstock oil. Therefore, a great amount of waste FCC and ROC catalysts are generated, which will lead to environmental damage if proper waste-treatment procedures have not been used.

In the conventional arts, waste-treatments of the waste FCC and ROC catalysts mainly rely on the use of calcinations or landfills. It is both wasteful and risky to discard waste FCC and ROC catalysts without any further treatment. These waste FCC and ROC catalysts are rich in metals, such as vanadium, nickel or rare earth metals, which may contribute to serious pollution or result in an ecological crisis, over time.

Besides, rare earth metal is an important material in modern industries, and is generally used in nonferrous metallurgy industries, atomic energy industries, and petrochemical industries. In the conventional arts, rare earth metals are recovered from waste catalysts via a roasting-acid leaching method, by roasting the rare earth metals at 600° C. to 700° C. under the performance of sodium carbonate, acid leaching rare earth metals with sulfuric acid, and finally precipitating and isolating rare earth metals with double salts.

However, the roasting-acid leaching method is inefficient, with only 2% to 5% of rare earth metals being recovered from the waste catalysts. Also, this method requires a lot of heat and accessory materials, so that it is both less effective and less economical.

Another conventional method to recover rare earth metals disclosed in CN101705380A and entitled as "A METHOD FOR RECOVERING RARE EARTH METALS FROM RARE EARTH METALS-CONTAINING ALUMINUM-SILICON MATERIALS" uses a similar stratagem to recover rare earth metals. This method comprises the processes of roasting, oxidizing, acid leaching and precipitating the metals with double salts. Yet, this conventional method shares the same disadvantages described above. Also, the conventional method has a poor rate of recovering vanadium and nickel from the waste catalysts.

Hence, there is a need of improving the conventional technique and developing a cost-and-time saving method for recovering vanadium, nickel and rare earth metals from waste catalysts.

SUMMARY OF THE INVENTION

The primary objective of this invention is to provide a method for recovering rare earth compounds, vanadium and nickel from waste vanadium-nickel catalysts, in which rare earth compounds, vanadium and nickel in high quality can be efficiently recovered through a time-saving and cost-efficient process.

The secondary objective of this invention is to provide a method for recovering rare earth compounds, vanadium and nickel from waste vanadium-nickel catalysts, by recovering useful metals from the waste catalysts produced by oil-refining industries so as to be eco-friendly.

Another objective of this invention is to provide a method for recovering rare earth compounds, vanadium and nickel from waste vanadium-nickel catalysts, in which the recovering of metals can be achieved in an easy and user-friendly platform.

A method for recovering rare earth compounds, vanadium and nickel from waste vanadium-nickel catalysts, comprising steps of: acid leaching, by soaking waste vanadium-nickel catalysts into a sulfuric acid solution and obtaining a mixture containing alumina silica slag; sedimentation, by filtering out the alumina silica slag from the mixture to obtain a filtrate, and then adding a salt into the filtrate to precipitate rare earth double salts followed by isolating a sediment of rare earth double salts and a liquid solution via filtration; and extraction, by providing and adding an alkali into the sediment of rare earth double salts followed by further soaking the rare earth double salts in an acid solution to precipitate rare earth oxalate or rare earth carbonate, and adding an oxidizer into the liquid solution to adjust the pH value thereof and then extracting vanadium and nickel from the liquid solution via an ion-exchange resin.

Further scope of the applicability of the present invention will become apparent from the detailed description given hereinafter. However, it should be understood that the detailed description and specific examples, while indicating preferable embodiments of the invention, are given by way of illustration only, since various applications will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

Figure 1:
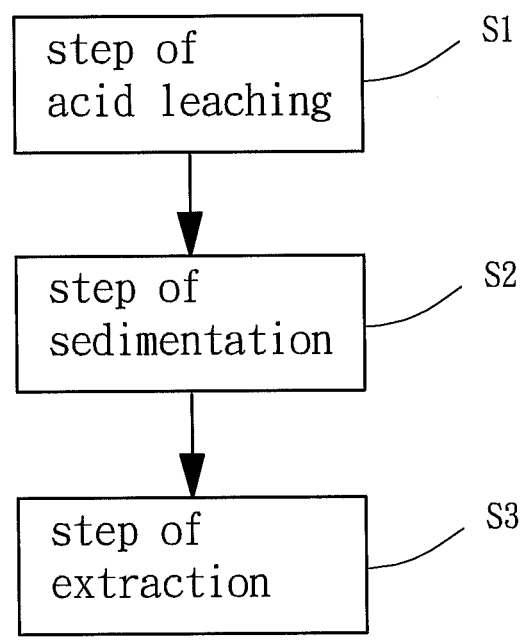
FIG. 1 is a diagram illustrating a method for recovering rare earth compounds, vanadium and nickel from waste catalysts in the present invention.

All figures are drawn for ease of explaining the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood. Furthermore, when the term "first", "second" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

In accordance with FIG. 1, there is a preferable embodiment of the method for recovering rare earth compounds, vanadium and nickel from waste vanadium-nickel catalysts, which comprises a step of "acid leaching S1," a step of "sedimentation S2," and a step of "extraction S3."

In the step of "acid leaching S1," waste vanadium-nickel catalysts are prepared and soaked in a sulfuric acid solution to obtain a mixture in which contains alumina silica slag. Precisely, the waste vanadium-nickel catalysts are mainly collected from oil-refining industries and are rich in rare earth metals, vanadium and nickel. Through soaking the waste vanadium-nickel catalysts in the sulfuric acid solution, a great amount of the alumina silica slag will be produced due to the inaction between insoluble parts of the waste vanadium-nickel catalysts, such as aluminum and silica, and the sulfuric acid solution. Meanwhile, the oxidization of sulfuric acid releases a lot of heat, which can not only maintain the reaction temperature at a proper range during the acid leaching without additional energy-supplement, but can also avoid the interference of the alumina silica slag with the isolation of rare earth compounds, vanadium and nickel. In the present invention, the concentration of the sulfuric acid solution is preferably adjusted at 1M to 5M, and the step of "acid leaching S1" is particularly preferably carried out at 90° C. to 95° C. for 1 to 4 hours, in order to produce maximum amount of alumina silica slag. The alumina silica slag produced the step of "acid leaching S1" in the present invention is easily isolated, recovered and manufactured into firebricks, so as to be significantly eco-friendly.

In the step of "sedimentation S2," the alumina silica slag is filtered out from the mixture to obtain a filtrate, as follows: a salt is prepared and added into the filtrate to precipitate rare earth compounds, and finally a sediment of rare earth double salts and a liquid solution are isolated via a filtration, wherein the liquid solution comprises mass amount of metals, such as vanadium and nickel, leached from the waste vanadium-nickel catalysts. Specifically, the great amount of alumina silica slag produced in the step of "acid leaching S1" is filtered out at first to obtain a filtrate being rich in rare earth compounds, vanadium and nickel. In the preferable embodiment, 5 wt % to 20 wt % of the salt is added into the filtrate, with the salt reacting and precipitating the rare earth compounds, to produce the sediment of rare earth double salts. Therefore, the sediment of rare earth double salts can be successfully isolated from liquid solution through the filtration due to its solid phase. In the present invention the salt can be selected from sodium sulfate, sodium chloride, ammonium sulfate or ammonium chloride, in order to produce double salts for precipitating rare earth compounds in the step of "sedimentation S2.

In the step of "extraction S3," an alkali is prepared and added into the sediment of rare earth double salts, followed by further soaking the rare earth double salts into an acid solution to precipitate other rare earth compounds. On the other hand, an oxidizer is also prepared and added into the liquid solution to adjust the pH value thereof, and then, vanadium and nickel in the liquid solution are extracted via an ion-exchange resin. In general, various metals, particularly to rare earth compounds, vanadium and nickel, can be extracted via any possible extracting processes in a random ranking according to the requirements of operators in the step of "extraction S3," for the sake of obtaining metals in high quality and content. In the present invention the processes to extract vanadium, nickel and rare earth compounds are obvious to one who has ordinary skill in the art, therefore, only a simple description is provided herein.

Figure 2:
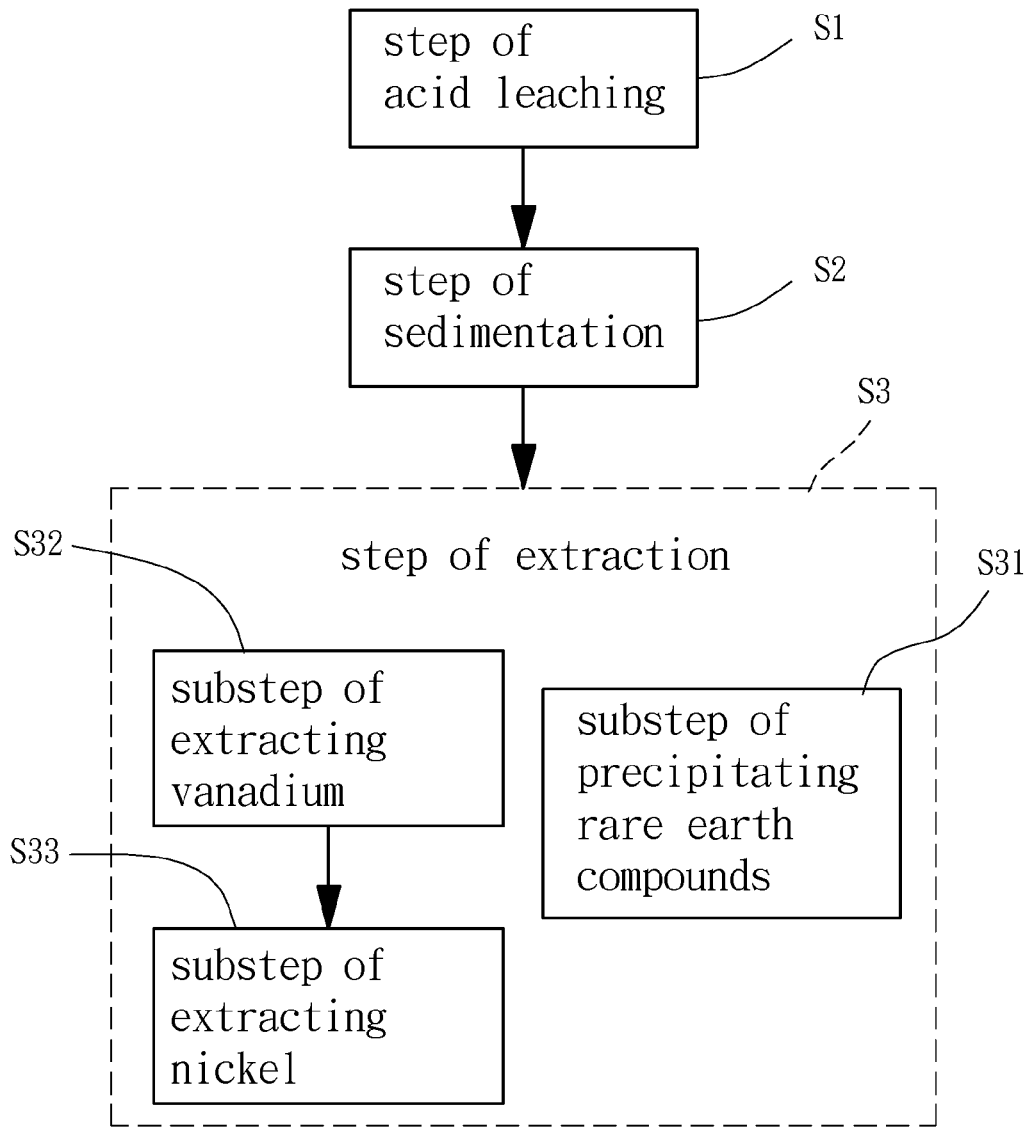
FIG. 2 is another diagram illustrating a method for recovering rare earth compounds, vanadium and nickel from waste catalysts in the present invention.

With reference to FIG. 2, the step of "extraction S3" comprises three substeps, including a substep of "precipitating rare earth compounds S31," by precipitating other rare earth compounds from the sediment of rare earth double salts; a substep of "extracting vanadium S32," by extracting vanadium from the liquid solution; and a substep of "extracting nickel S33," by extracting nickel from the liquid solution.

Precisely, in the substep of "precipitating rare earth compounds S31," the alkali is added into the rare earth double salts, with the alkyl replacing the double salts in the rare earth double salts and obtaining a caustic rare earth compounds, followed by acid leaching the caustic rare earth compounds with an acid. With such arrangement, the insoluble parts of the caustic rare earth compounds are easily filtered out and a filtrate solution, comprising a significant amount of rare earth metals, is obtained. Therefore, it is sufficient to precipitate and obtain rare earth compounds by adding a precipitin, oxalic acid or ammonium bicarbonate for example, into the filtrate solution. In the present invention, rare earth oxalate or rare earth carbonate are precipitated and obtained at the end. It is noted that the alkali of the present invention is selected but not limited to 3 wt % to 20 wt % sodium hydroxide, and the precipitin of the present invention is selected but not limited to oxalic acid or ammonium bicarbonate.

Next, in the substeps of "extracting vanadium S32" and "extracting nickel S33," the oxidizer is prepared and added into the liquid solution, in order to adjust the pH value thereof at a proper range, and then vanadium and nickel in the liquid solution are sequentially isolated by using an ion-exchange resin. Specifically, in the substep of "extracting vanadium S32," the pH value of the liquid solution is adjusted to 1 to 2 for the sake of recovering vanadium in a good efficiency. Moreover, in the substep of "extracting nickel S33," the pH value of the liquid solution is further adjusted to 5 to 6, with aluminum salts in the liquid solution being precipitating and filtered out at first, followed by isolating and recovering nickel through an ion-exchange resin. In the present invention the oxidizer is selected but not limit to oxygen, air, manganese dioxide, potassium permanganate, ozone or hydrogen peroxide.

Finally, an additional step can be performed at the end of the present invention to neutralize a residue left from the step of "extraction S3," by providing a small amount of calcium carbonate or calcium oxide to neutralize the residue and obtaining innocuous calcium sulfate which can be easily filtered out through another filtration. In this way the residue left in the present invention will become less polluted and is capable of being discarded in conformance with environmental regulations.

For proving the efficiency of the present invention, the leaching rate of rare earth compounds, vanadium, nickel and alumina silica slag is monitored and recorded under various conditions, such as various concentrations of sulfuric acid and various times of acid leaching, in the following paragraphs.

Referring to TABLE 1, 1000 grams of waste vanadium-nickel catalysts are prepared and soaked in 1M, 2M, 3M, 4M, or 5M of sulfuric acid at 95° C. for 2 hours to obtain the mixture, followed by filtering out alumina silica slag from the mixture to obtain filtrates, wherein the waste vanadium-nickel catalysts comprises 48 wt % aluminum oxide, 15 wt % silica, 0.5 wt % vanadium, 0.4 wt % nickel and 4 wt % rare earth compounds. In the present embodiment, the contents of the filtrates are analyzed and listed in TABLE 1.

TABLE 1

Contents of Filtrates under Various Concentration of Sulfuric Acid

| Leaching Rate (%) | Concentrations of Sulfuric Acid | | | | |
|---|---|---|---|---|---|
| | 1 | 2 | 3 | 4 | 5 |
| Aluminum oxide | 11 | 17 | 23 | 23 | 29 |
| Silica | 0.2 | 0.2 | 0.2 | 0.2 | 0.2 |
| Vanadium | 57 | 79 | 98 | 98 | 99 |
| Nickel | 61 | 86 | 90 | 91 | 91 |
| Rare earth oxalate or rare earth carbonate | 47 | 74 | 92 | 95 | 95 |

In TABLE 1, it is noted that the leaching rate of rare earth oxalate or rare earth carbonate, vanadium and nickel all reaches 90% when the concentration of the sulfuric acid is more than 3M. It is suggested that heat and acidity both increase with the concentration of the sulfuric acid, which is beneficial for not only the leaching of vanadium, nickel and rare earth metals but also in maintaining the temperature at a preferable range during the leaching.

Referring to TABLE 2, 1000 grams of waste vanadium-nickel catalysts are prepared and soaked in 3M sulfuric acid at 95° C. for 1, 2, 3, or 4 hours to obtain the mixtures, followed by filtering out alumina silica slag from the mixtures to obtain filtrates, wherein the waste vanadium-nickel catalysts comprises 48 wt % aluminum oxide, 15 wt % silica, 0.5 wt % vanadium, 0.4 wt % nickel and 4 wt % rare earth compounds. In the present embodiment, the contents of the filtrates are analyzed and listed in TABLE 2.

TABLE 2

Contents of Filtrates under Various Leaching times

| Leaching Rate (%) | Time of Acid Leaching | | | |
|---|---|---|---|---|
| | 1 | 2 | 3 | 4 |
| Aluminum oxide | 15 | 22 | 23 | 23 |
| Silica | 0.1 | 0.1 | 0.1 | 0.1 |
| Vanadium | 70 | 97 | 98 | 98 |
| Nickel | 77 | 90 | 90 | 91 |
| Rare earth oxalate or rare earth carbonate | 81 | 91 | 92 | 92 |

In TABLE 2, it is noted that the leaching rate of rare earth metals, vanadium and nickel all reaches to 90% when the leaching time is longer than 2 hours. It is believed that 2 hours of acid leaching is enough to obtain a maximum amount of vanadium, nickel and rare earth oxalate or rare earth carbonate in high quality, since only small amounts of rare earth oxalate or rare earth carbonate, vanadium and nickel are leached out in a longer time.

In order to further verify the effects of the present invention, the same waste vanadium-nickel catalysts, being 1000 grams in weight and comprising 48 wt % aluminum oxide, 15 wt % silica, 0.5 wt % vanadium, 0.4 wt % nickel and 4 wt % rare earth compounds, are prepared again and processed according to the method for recovering rare earth compounds, vanadium and nickel from waste vanadium-nickel catalysts in the present invention, and a sediment of rare earth double salts obtained from the step of "sedimentation S2" and labeled as "A;" and a filtrate solution obtained from the substep of "precipitating rare earth compounds S31" and labeled as "B" are collected and analyzed respectively. Finally, the recovering rate of rare earth compounds obtained from the filtrate solution "B" is also analyzed and labeled as "C." In particular, the waste vanadium-nickel catalysts are soaked into 3M sulfuric acid at 95° C. for 2 hours, followed by filtering out alumina silica slag to obtain a filtrate. After that, 10% ammonium sulfate is added to the filtrate, and the sediment of rare earth double salts "A" and a liquid solution are obtained. In the present embodiment, the rare earth double salts "A" further react with 6 wt % alkali solution and 10 wt % hydrochloric acid to obtain the filtrate solution "B" after filtering out some insoluble parts therein. Finally, the rare earth compounds in the filtrate solution "B" are precipitated and recovered by adding oxalic acid or ammonium bicarbonate, and the recovering rate of rare earth oxalate or rare earth carbonate from the filtrate solution "B" is "C." The contents of the sediment of rare earth double salts "A," and the filtrate solution "B," and the recovering rate "C" of rare earth oxalate or rare earth carbonate from the filtrate solution "B" are summarized in the TABLE 3.

TABLE 3

Contents of "A," and "B," and the recycling rate "C"

| (%) | A | B | C |
|---|---|---|---|
| Aluminum oxide | 3.3 | 7.3 | 0 |
| Vanadium | 0.15 | 0.01 | 0 |
| Nickel | 0.11 | 0.005 | 0 |
| Rare earth oxalate or rare earth carbonate | 99 | 98 | 98.7 |

In TABLE 3, it is shown that a significant amount of rare earth oxalate or rare earth carbonate can be obtained through the present invention, with a recovering rate higher than 95%. Also, the contents of alumina silica slag are decreased by the processes of the present invention, so that the extraction of rare earth oxalate or rare earth carbonate can be successfully achieved in a high efficiency without any disturbance from the alumina silica slag. Meanwhile, vanadium and nickel are completely left in the liquid solution, which is sufficient to be recovered sequentially in the substep of "extracting vanadium S32," and "extracting nickel S33," by adjusting the pH value of the liquid solution to a range of pH 1 to 2 or pH 5 to 6, and extracting the vanadium/nickel via an ion-exchange resin. In the present embodiment, the recovering rates of vanadium and nickel can reach to 95%, and 98% to 99% respectively. In additional, the aluminum oxide in the liquid solution can also be recycled through a form of hydroxide.

In summary, through the present invention, a method for recovering rare earth compounds, vanadium and nickel from waste vanadium-nickel catalysts is provided, with sulfuric acid accompanied with double salts acid leaching and precipitating metals from the waste vanadium-nickel catalysts, in which rare earth compounds, vanadium and nickel in high quality can be effectively recovered via a time-saving and user-friendly platform. The method for recovering rare earth compounds, vanadium and nickel from waste vanadium-nickel catalysts is mainly characterized in acid leaching and precipitating metals from the waste vanadium-nickel catalysts by using sulfuric acid and double salts. As a result, the interferences caused by alumina silica slag will be avoided, and also heat released due to the oxidization of sulfuric will maintain the temperature at a proper range for acid leaching. Therefore, it is believed that the method of the present invention is significantly frugal of cost and material, but highly efficient in recovering rare earth compounds, vanadium and nickel. Furthermore, the method of the present invention not only can recover waste vanadium-nickel catalysts, but also can reduce the chemical pollution resulting from the conventional arts, with the residue left behind being easy to neutralize with a small amount of calcium oxide or calcium carbonate.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for recovering rare earth compounds, vanadium and nickel from waste catalysts rich in vanadium and nickel, comprising steps of:
   acid leaching, by soaking waste vanadium-nickel catalysts rich in vanadium and nickel into a sulfuric acid solution and obtaining a mixture containing alumina silica slag;
   sedimentation, by filtering out the alumina silica slag from the mixture to obtain a filtrate, and then adding a salt into the filtrate to precipitate rare earth double salts followed by isolating a sediment of rare earth double salts and a liquid solution via filtration; and
   extraction, by providing and adding an alkali into the sediment of rare earth double salts followed by further soaking the rare earth double salts in an acid solution to precipitate rare earth oxalate or rare earth carbonate, and adding an oxidizer into the liquid solution to adjust the pH value thereof and then extracting vanadium and nickel from the liquid solution via an ion-exchange resin.

2. The method for recovering rare earth compounds, vanadium and nickel from waste catalysts rich in vanadium and nickel as defined in claim 1, wherein the step of extraction further comprises substeps of: precipitating rare earth oxalate or rare earth carbonate, by precipitating rare earth oxalate or rare earth carbonate from the sediment of rare earth double salts obtained from the step of sedimentation; extracting vanadium, by extracting vanadium from the liquid solution also obtained from the step of sedimentation; and extracting nickel, by extracting nickel from the liquid solution also obtained from the step of sedimentation,
   wherein in the substep of precipitating rare earth oxalate or rare earth carbonate, a sodium hydroxide used as the alkali is added into the rare earth double salts, with the sodium hydroxide replacing the double salts and obtaining a caustic rare earth compounds, followed by leaching the caustic rare earth compounds with hydrochloric acid, filtering out insoluble parts of the caustic rare earth compounds to obtain a filtrate solution, and adding oxalic acid or ammonium bicarbonate into the filtrate solution to precipitate rare earth oxalate or rare earth carbonate.

3. The method for recovering rare earth compounds, vanadium and nickel from waste catalysts rich in vanadium and nickel as defined in claim 2, wherein the concentration of the sodium hydroxide is 3 wt% to 20 wt% and the concentration of the hydrochloric acid is 5 wt% to 30 wt%.

4. The method for recovering rare earth compounds, vanadium and nickel from waste catalysts rich in vanadium and nickel as defined in claim 2, wherein, in the substep of extracting vanadium, the pH value of the liquid solution is adjusted to pH 1 to 2 by adding the oxidizer, and then vanadium is extracted from the liquid solution via the ion-exchange resin.

5. The method for recovering rare earth compounds, vanadium and nickel from waste catalysts rich in vanadium and nickel as defined in claim 2, wherein, in the substep of extracting nickel, the pH value of the liquid solution is adjusted to pH 5 to 6 by adding the oxidizer firstly, next, aluminum salts in the liquid solution are precipitated and filtered out from the liquid solution, and nickel in the liquid solution is extracted via the ion-exchange resin finally.

6. The method for recovering rare earth compounds, vanadium and nickel from waste catalysts rich in vanadium and nickel as defined in claim 1, wherein the concentration of the sulfuric acid solution is adjusted to 1M to 5M in the step of acidic leaching.

7. The method for recovering rare earth compounds, vanadium and nickel from waste catalysts rich in vanadium and nickel as defined in claim 1, wherein the temperature of the step of acidic leaching is adjusted to 90° C. to 95° C. to soak the waste catalysts rich in vanadium and nickel into the sulfuric acid solution for 1 to 4 hours.

8. The method for recovering rare earth compounds, vanadium and nickel from waste catalysts rich in vanadium and nickel as defined in claim 1, wherein the concentration of the salt in the filtrate is 5 wt% to 20 wt% in the step of sedimentation.

9. The method for recovering rare earth compounds, vanadium and nickel from waste catalysts rich in vanadium and nickel as defined in claim 1, wherein the salt is sodium sulfate, sodium chloride, ammonium sulfate or ammonium chloride.

10. The method for recovering rare earth compounds, vanadium and nickel from waste catalysts rich in vanadium and nickel as defined in claim 1, wherein the oxidizer is oxygen, air, manganese dioxide, potassium permanganate, ozone or hydrogen peroxide.

* * * * *